US009359078B2

(12) United States Patent
Burd (10) Patent No.: US 9,359,078 B2
(45) Date of Patent: Jun. 7, 2016

(54) AIRCRAFT GALLEY MONUMENT STRUCTURE

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 178 days.

(21) Appl. No.: 13/850,781

(22) Filed: Mar. 26, 2013

(65) Prior Publication Data

US 2013/0256249 A1    Oct. 3, 2013

Related U.S. Application Data

(60) Provisional application No. 61/616,904, filed on Mar. 28, 2012.

(51) Int. Cl.
    *B64D 11/04*      (2006.01)

(52) U.S. Cl.
    CPC . *B64D 11/04* (2013.01); *Y02T 50/46* (2013.01)

(58) Field of Classification Search
    CPC ........................................................ B64D 11/04
    USPC ....................................................... 244/118.5
    See application file for complete search history.

(56) References Cited

U.S. PATENT DOCUMENTS

| | | | | |
|---|---|---|---|---|
| 3,628,842 A * | 12/1971 | Wright | ........................... | 312/259 |
| 3,995,081 A * | 11/1976 | Fant | ..................... | B29C 70/865 244/123.3 |
| 4,219,980 A * | 9/1980 | Loyd | ..................... | B29C 65/562 156/92 |
| 4,715,560 A * | 12/1987 | Loyek | ..................... | B29C 70/24 244/117 R |
| 5,024,399 A * | 6/1991 | Barquet | ................... | B29C 70/44 244/119 |
| 5,083,727 A | 1/1992 | Pompei et al. | | |
| 5,462,618 A * | 10/1995 | Rogers | ................. | B29C 15/122 156/160 |
| 6,257,523 B1 * | 7/2001 | Olliges | ....................... | 244/118.5 |
| 6,655,633 B1 * | 12/2003 | Chapman, Jr. | .......... | B29C 53/60 244/123.9 |
| 7,565,903 B2 | 7/2009 | Sasaki et al. | | |
| 7,654,487 B2 * | 2/2010 | Ghoreishi et al. | ......... | 244/118.5 |
| 7,780,114 B2 | 8/2010 | Doebertin et al. | | |
| 7,954,761 B2 | 6/2011 | Johnson et al. | | |
| 8,034,453 B2 * | 10/2011 | Wang et al. | .................... | 428/413 |
| 8,087,611 B2 | 1/2012 | Arnold et al. | | |

(Continued)

FOREIGN PATENT DOCUMENTS

DE      102009005478 A  *  2/2011
WO      2012040564 A2    3/2012

OTHER PUBLICATIONS

Machine translation of DE 102009005478 B4, pulled Nov. 12, 2014, p. 1-8.*

(Continued)

*Primary Examiner* — Elizabeth A Quast
(74) *Attorney, Agent, or Firm* — Fulwider Patton LLP (57) ABSTRACT

An improved monument structure combining an integrated construction system with carbon fiber reinforced composites to form an exoskeleton chassis. The chassis includes an above work deck subassembly, a below work deck subassembly, and a rear service wall subassembly, each respective subassembly is formed using carbon fiber reinforced composites (CFRC) pre-impregnated panel skins. The subassemblies are reinforced with a unidirectional carbon fiber.

12 Claims, 7 Drawing Sheets

(56) References Cited

U.S. PATENT DOCUMENTS

| | | | |
|---|---|---|---|
| 8,096,504 B2* | 1/2012 | Arevalo Rodriguez | B29D 99/0014 244/119 |
| 8,136,762 B2* | 3/2012 | Gauggel et al. | 244/118.5 |
| 8,382,033 B2* | 2/2013 | Reece | 244/118.1 |
| 8,387,916 B2 | 3/2013 | Baatz et al. | |
| 8,540,833 B2* | 9/2013 | Deobald | B29C 70/865 156/180 |
| 8,785,779 B1* | 7/2014 | Jones et al. | 174/72 A |
| 2007/0228216 A1 | 10/2007 | Wenstrom | |
| 2008/0150406 A1 | 6/2008 | Arnold et al. | |
| 2009/0283636 A1* | 11/2009 | Saint-Jalmes et al. | 244/118.5 |
| 2009/0283638 A1* | 11/2009 | Arevalo Rodriguez | B29D 99/0014 244/119 |
| 2009/0317587 A1* | 12/2009 | Deobald | B29C 70/865 428/119 |
| 2009/0321574 A1 | 12/2009 | Erickson et al. | |
| 2010/0224726 A1* | 9/2010 | Lu et al. | 244/118.5 |
| 2012/0076973 A1* | 3/2012 | Guzman | B29C 70/207 428/113 |
| 2012/0085862 A1 | 4/2012 | Pangalila | |
| 2012/0217343 A1 | 8/2012 | Koschberg et al. | |
| 2012/0285335 A1 | 11/2012 | Cunningham et al. | |
| 2013/0126672 A1* | 5/2013 | Weitzel et al. | 244/118.6 |
| 2013/0206907 A1* | 8/2013 | Burrows et al. | 244/118.5 |
| 2013/0259562 A1* | 10/2013 | Burd | 403/187 |
| 2013/0306794 A1* | 11/2013 | Zahlen et al. | 244/118.5 |

OTHER PUBLICATIONS

EPO, International Search Report and Written Opinion in counterpart International Patent Application No. PCT/US2013/034161 dated Jun. 13, 2013.

* cited by examiner

AIRCRAFT GALLEY MONUMENT STRUCTURE

CROSS-REFERENCES TO RELATED APPLICATIONS

This application claims priority from U.S. Provisional Patent Application No. 61/616,904, filed Mar. 28, 2012, incorporated herein by reference in its entirety.

BACKGROUND

Commercial passenger carrying airplanes commonly have storage or compartment structures (frequently referred to by the generic name "monuments") installed on the aircraft. These structures are used in a variety of ways, such as storage of clothing and other passenger belongings, electronic entertainment centers, sleeping quarters for the officers and cabin crew, purser work stations, bar units, lavatories, and galleys used to provide in-flight catering meal service to the passengers. Traditionally, these monuments have been manufactured using multi-layered lightweight assemblies known as "sandwich panels" of Nomex® or Kevlar® cores, with resin pre impregnated fiberglass skins forming the surface. Other types of composite panels are manufactured with foam, thermo-plastic or metallic core materials and with plastic or metallic outer skins. Aircraft monuments may alternatively be constructed entirely from flat sheet materials that are pre manufactured in a process using a multi-layer temperature controlled press, and/or from molds using an autoclave to provide both temperature and pressure for curing of the panel, part or section.

Following manufacture, these parts or sections have to undergo additional "pre or post processing" where they may be trimmed, cut and/or formed into the parts necessary to construct the monument. They will also commonly undergo secondary operations to have fixing points and/or locating holes installed in the form of "inserts" or "bobbins." In the case of the former, they provide a means of attaching items to the panel, and rely on the injection of an adhesive around the fixing to form a plug that resists being pulled out through the skin when a load or force is applied to it. In the case of the latter, a through hole is provided for fixings that would otherwise damage the panel.

Items attached to the panels include wiring looms and electrical components, plumbing hoses, pipes and components, ventilation and air extraction duct, hose and component mountings, décor panels, hinges, back stops, galley insert equipment interfaces, access panels, ducts, sliders and draw runners, electronic entertainment devices, grilles, and general equipment retainers.

After the preparatory stages are complete, the monument is constructed by assembling the various parts, either by bonding the flat panels together to form a rigid structure with viscous liquid adhesives, or by combining the flat panels with pre manufactured (e.g. pre cured) molded parts to form the basic structure. These molded sections or flat panel sub-assemblies may also remain as removable (i.e. bolt on/bolt off parts). Likewise, adhesive bonded flat panels forming sub-assemblies or modules may be bolted together to form the complete structure.

Basic construction in all cases involves a post composite panel manufacturing process that relies on bonding using liquid adhesives for the panels forming the structure itself, the fixing points, through holes and mountings and/or the sub-assemblies, modules and moldings themselves. Further, secondary operations attaching various loose metallic and non-metallic parts to the basic structure, together with electrical, water and air systems are then undertaken. These separate processes add significantly to the cost and construction time, and require a high level of expert knowledge and operator skill.

Another issue with the current monument construction is the need for reinforcement. To reinforce a given monument structure, "C," "U," "H," "F" and right angle as well as other shapes of section aluminum extrusions are commonly bonded to the edges of the panels for stiffness. Where local re-enforcement of the structure is required (for load bearing purposes), flat sheets of aluminum, typically 1/32" to 1/8" thick, are bonded to the panel to transfer the effects of localized stress to portions of the structure with higher load bearing capabilities. This type of additional localized reinforcement is commonly called a "doubler." This practice adds significant weight to the Monument and requires another manufacturing process, adding the cost.

SUMMARY OF THE INVENTION

The present invention is an improved monument structure combining an integrated construction system with carbon fiber reinforced composites to form an exoskeletal chassis that significantly reduces the build times, manufacturing skill level requirements, post processing activities, and overall weight of a given aircraft monument. New monument designs may be analyzed using finite element analysis to determine the maximum load that will be imposed on the improved structure, and then all local reinforcement requirements will be incorporated into the integrated structure as determined by the monument's worst case loading determination.

The construction of the monument of the present invention calls for designing the lay-up of a composite panel sandwich to include integral localized reinforcement, capable of handling the stress loads imposed on the structure without the need for additional supplementary metallic reinforcement. All fixing points (which include both floating and fixed potted inserts), through holes, brackets, back stops for cart that prevent rearward movement, wear strip bases (rub and bump strips) trolley wheel guides, GAIN interface points, ducts, electrical routing channels and other secondary process items, are incorporated in the primary manufacturing process.

The primary manufacturing process consists of a modular, reversed molding system utilizing carbon fiber reinforced composite pre impregnated skins (referred to as CFRCs) with or without a core structure, and localized reinforcement of unidirectional carbon fiber (referred to as UD fiber) that are applicable to the structural requirements and loadings of the particular monument. Where applicable, previously manufactured I and H beams are incorporated into the structure to provide high strength reinforcement. The molds may or may not be modular in construction, depending on the type of monument being constructed, and will have a specific construction applicable to their intended function.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
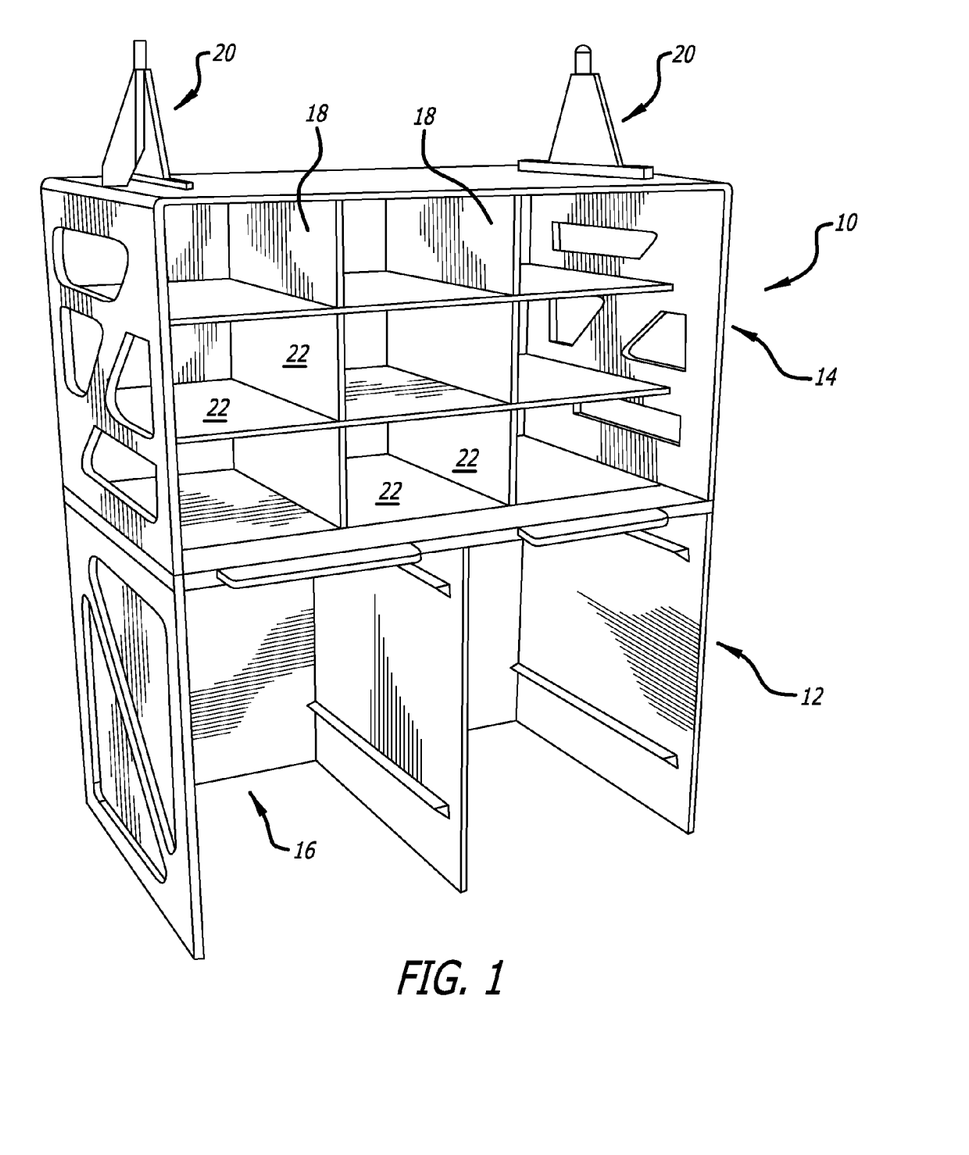
FIG. 1 is an elevated, perspective view of a first embodiment of the monument structure of the present invention.
Figure 2:
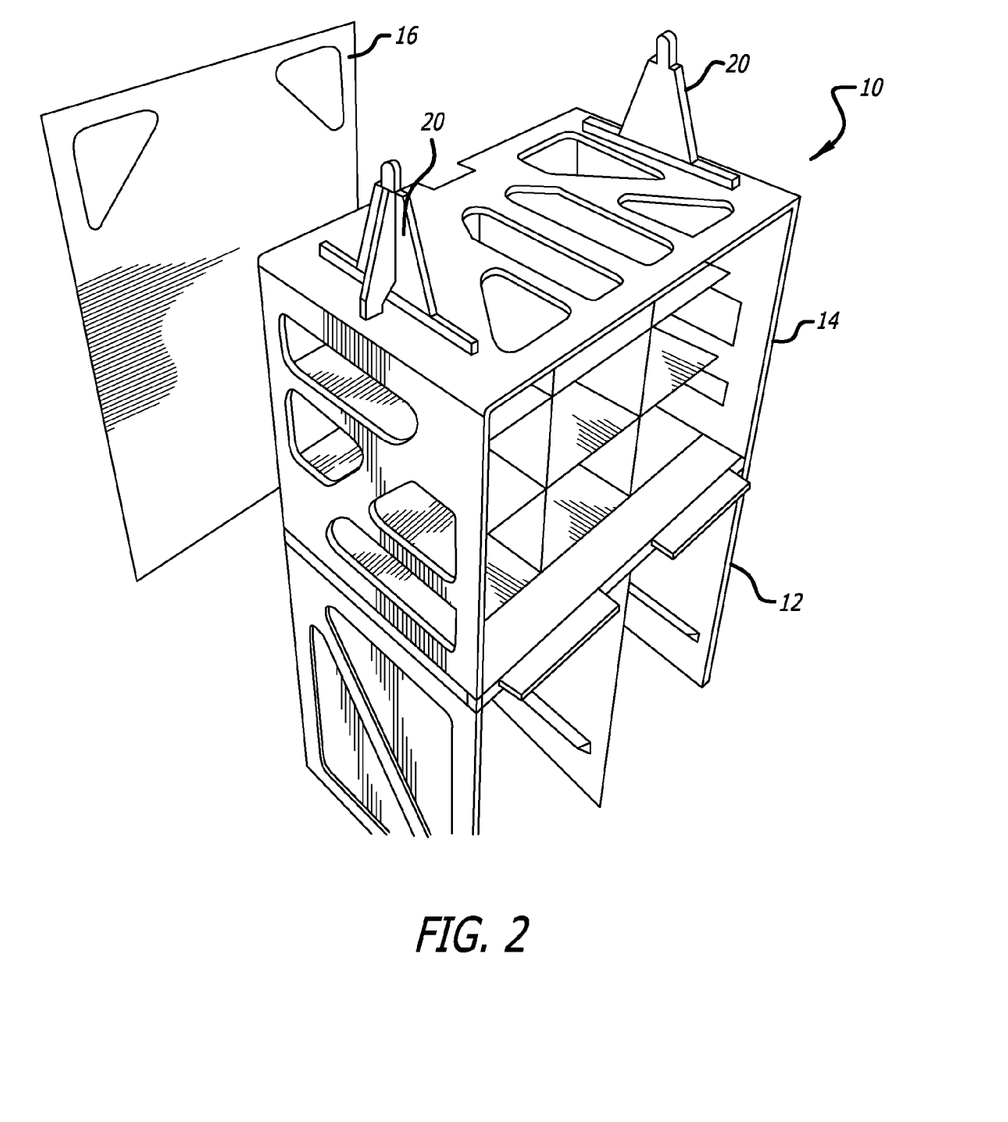
FIG. 2 is a partially exploded, elevated, perspective view of the embodiment of FIG. 1.

FIGS. 1 and 2 illustrate a first preferred composite aircraft monument in the form of a refrigerated center line galley 10 that comprises three main chassis sub-assemblies, a below work deck area (BWD) 12, an above work deck area (AWD) 14, and a removable, one piece rear service wall (RSW) 16. The AWD section 14 provides compartments 18 as required for galley inserts, or GAINs, such as coolers, ovens, coffee brewers, and the like to be installed. The AWD section 14 compartments 18 also provide space for meal boxes or standard units (SUs), and miscellaneous storage in the same way, together with compartment door hinge and latch locations, if so required. On top of the above work deck area 14 is a pair of composite ceiling mounts 20 for attaching the monument 10 from above to the ceiling or supporting structure of the airframe.

Figures 3, 3A:
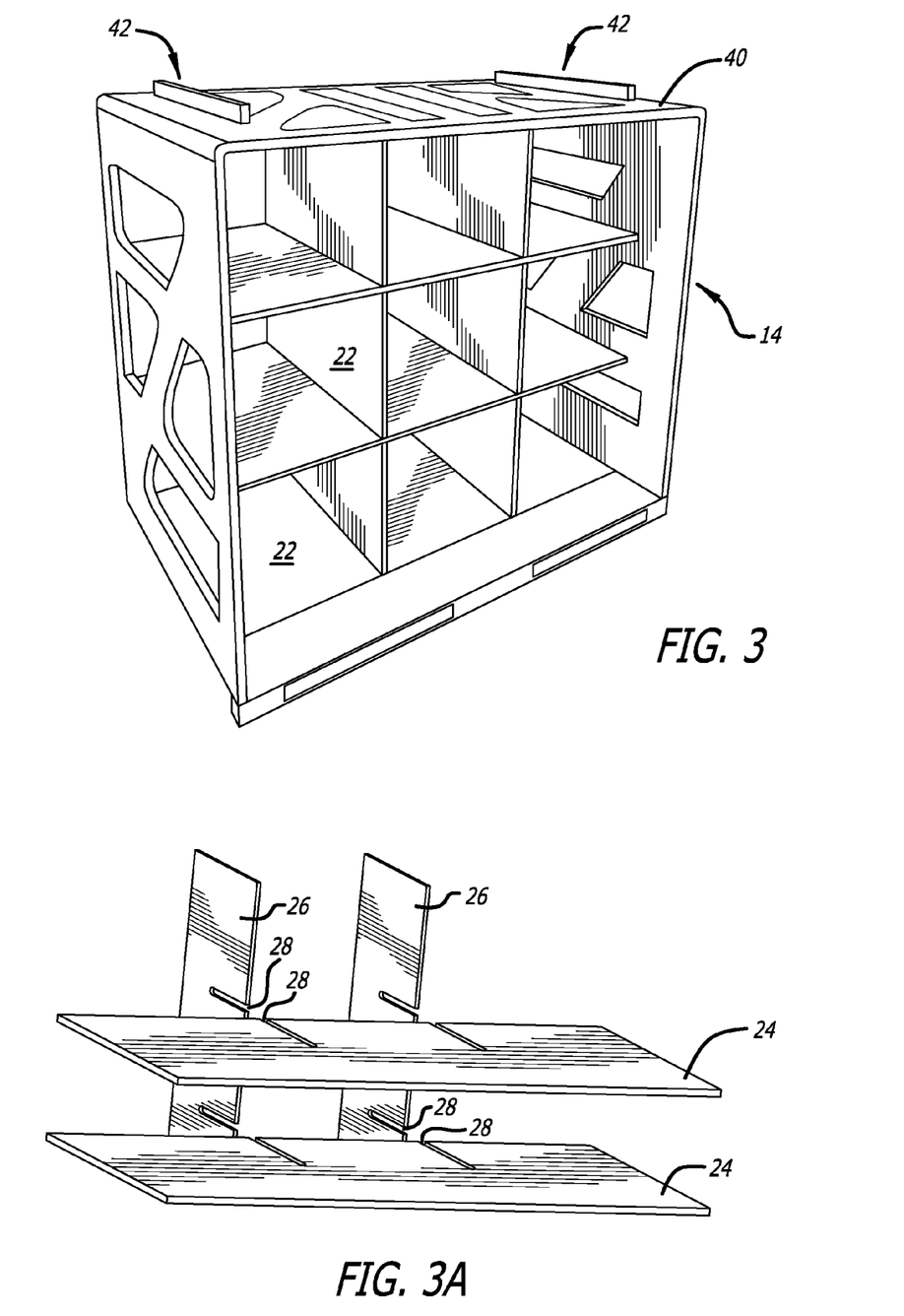
FIG. 3 is a perspective view of the above work deck sub-assembly of the embodiment of FIG. 1.
FIG. 3A is an enlarged, perspective view of the way in which the compartments of the above work deck are formed.
Figure 3B:
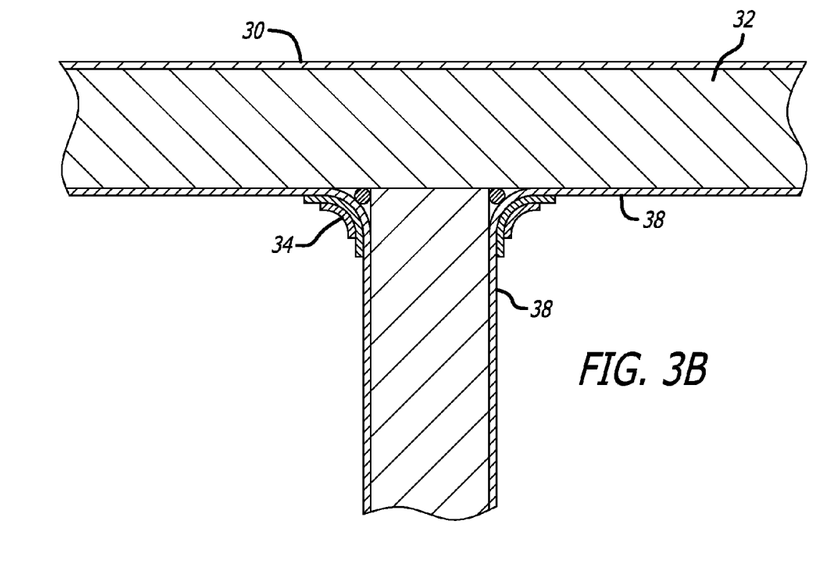
FIG. 3B is a cross-sectional view of an intersection of the panels in the sub-assemblies of the present invention.

The compartments 18 of the above work deck 14 are defined by panels 22 as shown in FIG. 3, that is formed of previously manufactured flat CFRC-faced panels integrated into the structure using slots 28 at the intersection of the horizontal shelves 24 and the vertical walls 26 (See FIG. 3A). The shelves 24 and walls 26 are formed using a wet lay process where layers 30 of material are placed in a mold in over a wet lay 32, and the walls 26 and shelves 24 are then integrated into the assembly using additional UD reinforcing plies 34 (see FIG. 3B). When formed in this manner, the panels need no additional secondary stiffening, and separate metallic edge members are not required, although the edges of the panel may be sealed with a lightweight plastic extrusion. The edges may also be covered with overlapped panel skin plies 38. The "B" surface 30, i.e. the finished molded surface opposite the usual orientation of the lay-up, of the AWD molding preferably either provides the upper section of the air ducting for a chiller in the work deck ("CIWD") air chiller fed system, or provides for a CIWD line replacement unit ("LRU") chiller module. Non-chilled galleys that may not have this provision for ductwork may instead have a structure for other items such as sliding tables. In a preferred embodiment, the whole AWD section 14 is cured as a single and complete integrated structural sub-assembly.

Figure 8:
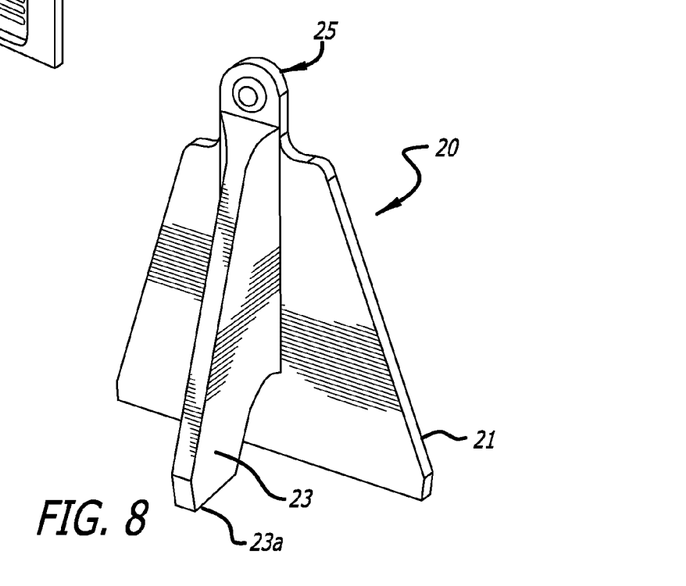
FIG. 8 is an enlarged, perspective view of a composite roof attachment.

On the upper surface 40 of the above work deck area 14 is a pair of horizontal channels 42 that can be used to adjustably position the monument 10 within the aircraft. Roof attachments 20 (see FIG. 8) is formed of a high strength composite and have orthogonal plates 21, 23, where plate 21 extends below a lower surface 23a such that plate 21 can slide within its channel 42 and be clamped or fastened in the desired location. The plate 23 then rests on the upper surface 40 of the above work deck 14 to stabilize the attachment. The roof attachment 20 can include a lug 25 that can be used to bolt, rivet, or otherwise secure the monument 10 to the upper airframe structure.

Figure 5:
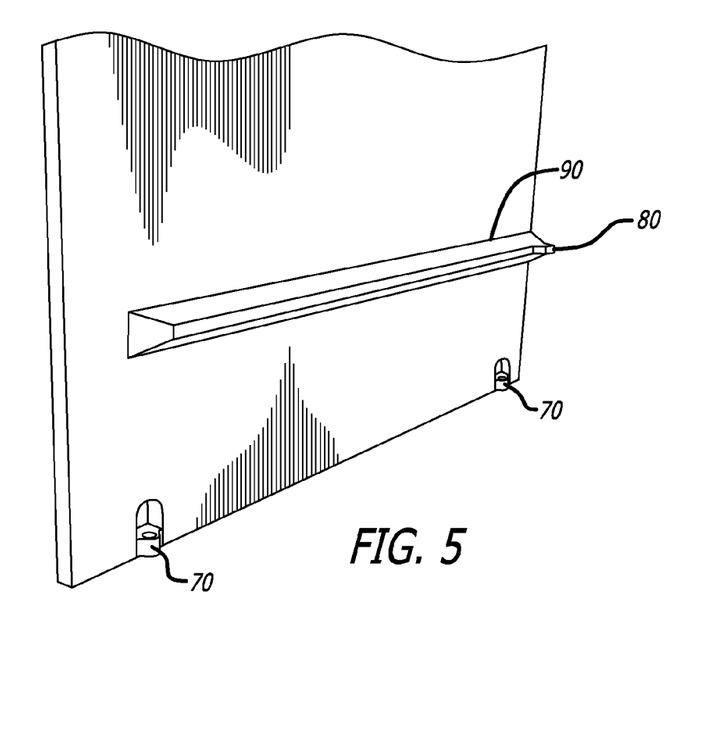
FIG. 5 is an enlarged, perspective view of the bump strip carrier for the below work deck sub-assembly of FIG. 4.

The BWD section 12 provides accommodation in the form of two large cabinets 50 for meal service carts or trolleys, storage compartments, waste container areas, trash compactor location, galley waste disposal units (GWDU) and/or miscellaneous stowage areas. Further, the below work deck section incorporates fixing and locating points, including integrated aircraft floor attachment devices 70 (see FIG. 6), back stops 80, cart dividers (T dividers) 85, and rub and bump strip bases 90. Divisions between the compartments are formed during the wet lay process or integrated into the assembly using additional UD reinforcing plies, as discussed above with respect to FIG. 3. FIG. 5 shows a view of the rub and bump strip 90, along with the back stop 80 to prevent the beverage cart (not shown) from extending too far into the cabinets 50.

Figure 6:
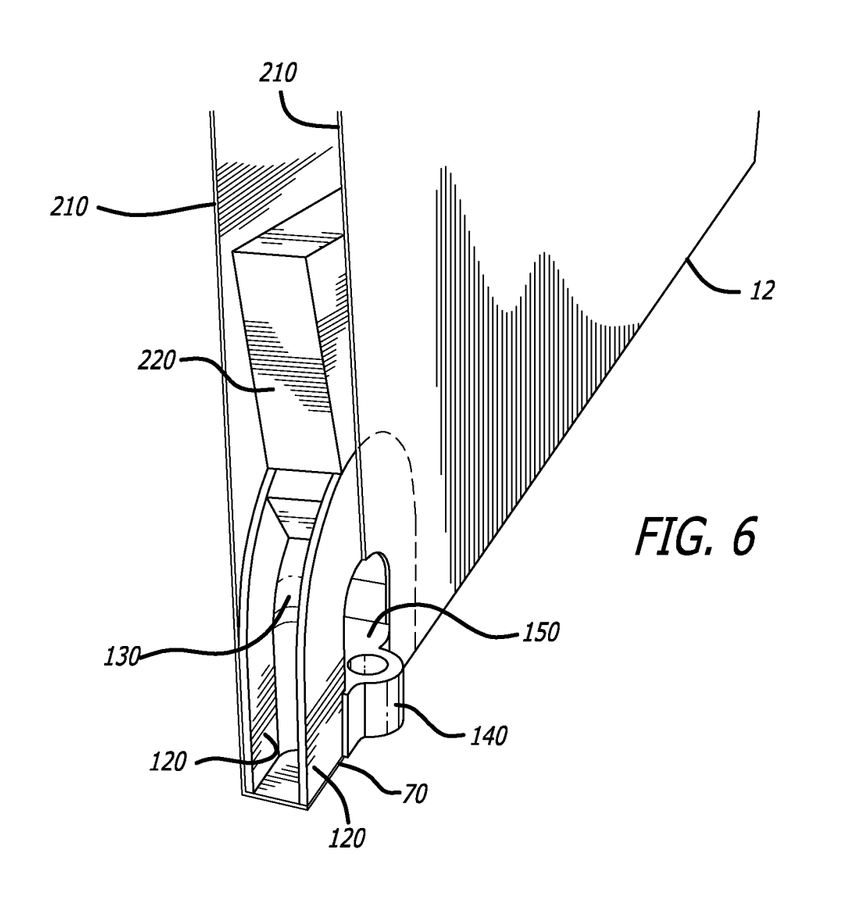
FIG. 6 is an enlarged, perspective view of an integrated floor attachment device of the sub-assembly of FIG. 4.

FIG. 6 illustrates an integrated floor attachment device 70 incorporated into the walls 210 of the below work deck section 12. The floor attachment device 70 comprises two horseshoe shaped plates 120 having an outer radius along the perimeter and an inner radius along the inner edge. The two plates 120 are joined together along the inner radius by a rigid panel 130, such that there is an arcuate gap between the two plates 120, and between the rigid panel 130 and the outer radius of the two plates 120. The connection of the two plates 120 to the rigid panel 130, such as by welding for example, is sufficient to transfer loads from the panel 130 to the plates 120.

At the base of the attachment device 70 are a pair of lugs 140 including a vertical channel 150 sized to receive a fastener (not shown). The lugs 140 are preferably positioned such that no more than half of the lug 140 is outside of the envelope of the two plates 120. The two lugs 140 are formed from a common block, that also connects to the rigid panel 130. The bottom edge of the plates 120 coincide with a bottom edge of the lugs 140 such that the attachment device 70 lays flush with a floor of the aircraft. Sandwiched between the monument walls is a composite panel core material 220 that forms the interior of the wall structure. At the base of the wall, between the panels 210, is the floor attachment device 70 that is used to mount the wall to the floor of the aircraft. A space above the cylindrical lugs 140 can be used to insert and remove the fasteners, and the arch shape of the fitting contributes to the overall strength of the fitting.

In a preferred embodiment, the attachment device 70 is integrated in the wall structure of the monument 10 during the primary build phase, eliminating the need for a secondary operation and greatly improving the component strength and the ability of the structure to handle both static and dynamic loads. This is particularly important in a vehicle such as an aircraft, which is subject to dynamic loads on a consistent basis. The lugs 140 create a small offset that allow the monument structure to have a greater proportion of standardized parts while reducing the weight of the component as well as the footprint of the monument. In a non-metallic form, such as a composite or hardened plastic, the fitting 70 can be mass produced, very light, and resistant to corrosion.

Figure 4:
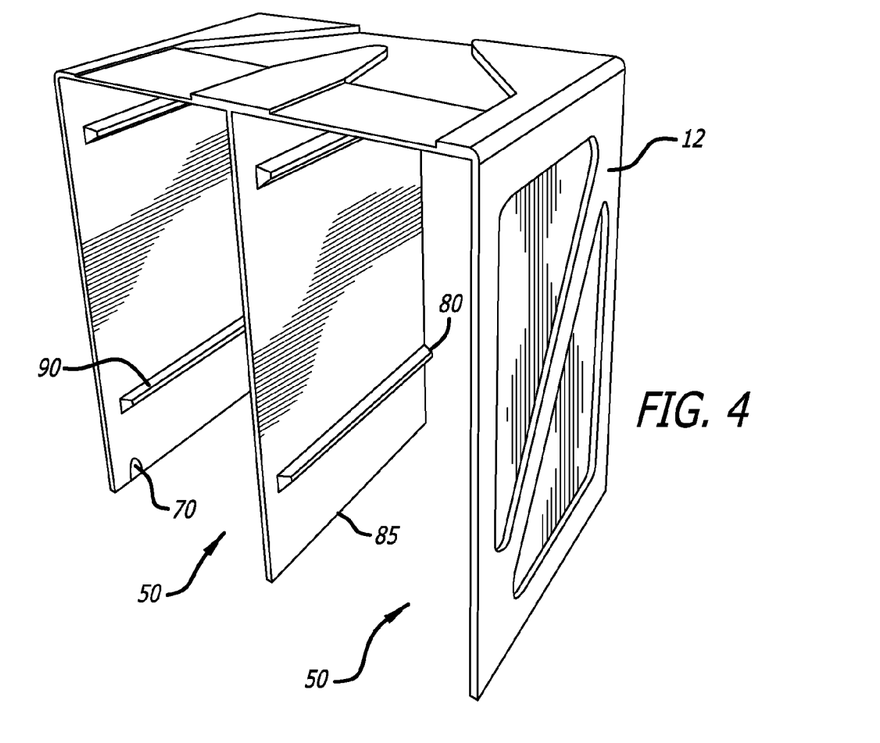
FIG. 4 is a perspective view of the below work deck sub-assembly of the embodiment of FIG. 1.
Figure 4A:
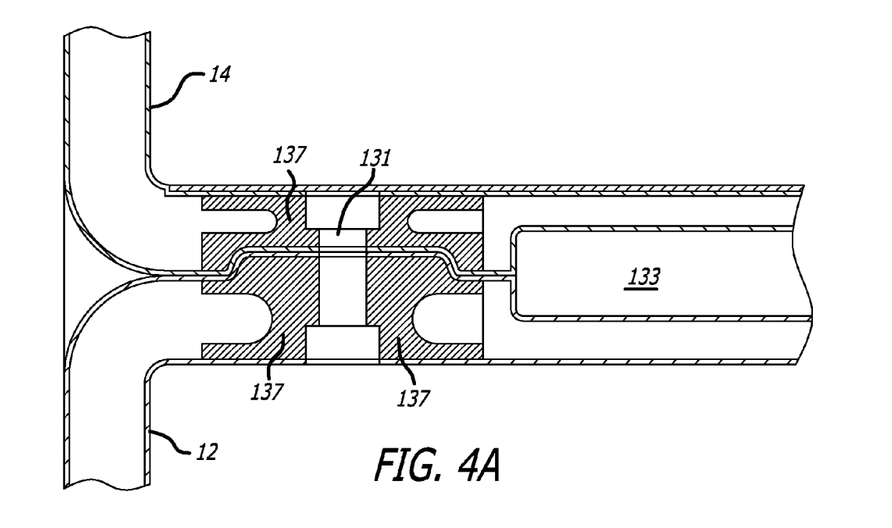
FIG. 4A is a cross-sectional view of the mating of the above work deck and below work deck sub-assemblies.

As the panels of the above work deck 14 and below work deck 12 need no additional secondary stiffening, separate metallic edge members are not required; however, the edges of the panel may be sealed with a lightweight plastic extrusion 137 or use overlapped panel skin plies (FIG. 4A). The mating surface of the BWD's molding either provides the lower section of the air ducting for a CIWD air chiller fed system or provides for a CIWD LRU chiller module. Further, the whole BWD section 12 is preferably cured as a single and complete integrated structural sub assembly. Note the AWD 14 and BWD 12 sub assemblies have the provision of male and female attachment points to allow structural connection of the two halves. The alignment of the two mating sub-assemblies 12,14 share a common through-hole 131 that can be used to secure the two components. When the two mating surfaces are bolted together, a gap 133 is formed between the surfaces that can promote cooling or venting.

Figure 7:
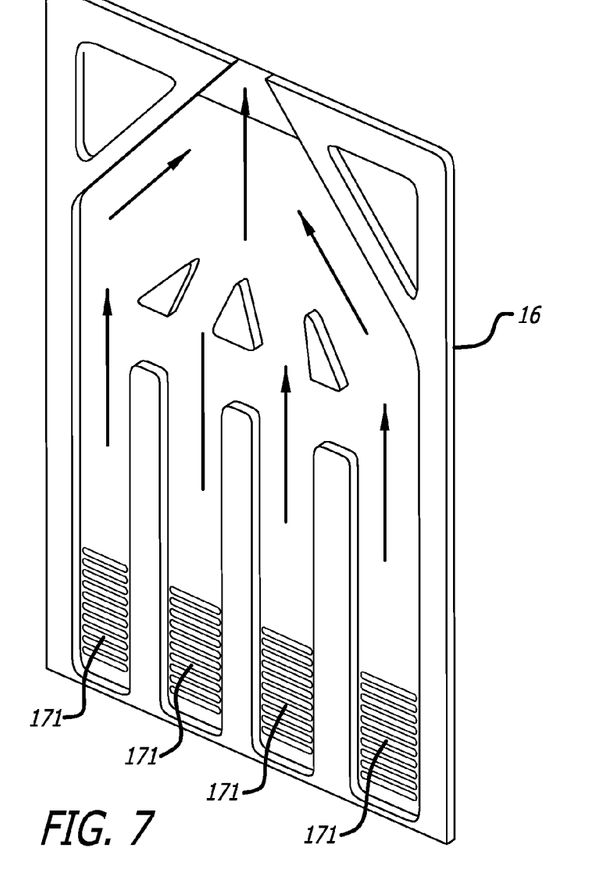
FIG. 7 is a perspective, front view of the rear service wall of the monument structure.

FIG. 7 illustrates the rear service wall 16, which preferably carries the majority of the galley electrical and plumbing service provisions. The RSW also provides the integrated chilled air ducting system (for both the AWD 14 and BWD 12 in the case of an air chiller supplied galley, and BWD only in the case of a chilled liquid supplied galley), and applicable galley insert retention and location provisions. The rear service wall 16 is also preferably cured as a single and complete integrated structural sub assembly. Wiring and plumbing components are mounted to the RSW 16 following the curing process. The RSW sub assembly may also have the provision of male and female attachment points to allow a structural connection to the two halves of the AWD and BWD sub assemblies. In a preferred embodiment, the rear service wall 16 includes a series of air vents 171 near the bottom of the RSW, where the vents 171 are located in recesses in the wall as shown in FIG. 7. The recesses extend vertically to a midpoint, where they funnel and consolidate into a single recess that vents through the top of the RSW 16. This venting system allows air to circulate over the electrical system to prevent overheating, or to cool the backs of refrigeration units or other GAINs that require venting.

Although the above examples relate to one type of monument, i.e. a galley, the present intention is not limited in this manner and is applicable to the use and incorporation in the construction of other commercial aircraft monuments using the same or broadly similar methods.

The present invention is characterized in that the replacement of conventional pre-impregnated fiber glass panel skin materials with carbon fiber reinforced composites pre impregnated panel skin materials are used to form a structurally competent exoskeleton chassis that produces significant weight savings and strength advantages. The present invention also results in the elimination of a high percentage of cold bridges (caused by conduction through embedded metallic fixings, edge members, floor fittings, etc.) that are present between the exterior and the interior of refrigerated or chilled galley compartments, resulting in improved thermal insulation capabilities and lower cooling power requirements from the air or liquid chiller supplying the monument.

The present invention also leads to the elimination of a significant percentage of aircraft monument panel secondary processing operations, consisting of the provision of load bearing attachment points, through holes, locating points, access apertures, air ducting, reinforced beams, air craft attachment points, rub and bump strips, T dividers, back stops, etc., by integrating them into the primary molding operation. This results in a reduction in construction man hours, partial de-skilling of manufacturing processes, and significant weight saving advantages.

The present invention allows for the integration of chilled air distribution into the structure work deck area. Additionally, the combination of dry panel components, specific area reinforcements and pre manufactured CFRC parts incorporated into an integrated wet lay assembly lead to the formation of structural skeletal sub-assemblies. An advantage of the present invention is the elimination of the current requirement for metallic edge members for the purpose of stiffening and/or edge sealing of structural galley composite panels, through the use of CFRC panels with overwrapped skin or plastic capped edges. As set forth above, this provides significant cost and structure weight savings.

Another benefit of the present invention is the elimination of the use of supplementary localized metallic reinforcements. The present invention utilizes additional UD carbon plies (where required) to provide an integral integrated reinforcement solution, and results in significant manufacturing process time, and overall structure weight savings. The integration of major services into a single removable back panel for monuments, where electrical, plumbing, vacuum, refrigeration, CAX or ventilation systems are required, simplifies assembly and allows parallel flow line production.

Yet another feature of the present invention is the adoption of reverse molding to combine a wet/dry composite lay-up consisting of uncured materials, pre manufactured panels and composite components, to form an integrated primary manufacturing system. Additionally, the present invention's use of CFRCs significantly increases the strength of the monument for a given size while decreasing the structure weight. Also, the wet/dry molding system significantly reduces build times by integrating many secondary assembly operations into the primary manufacturing process.

A secondary benefit of the present invention is that the primary manufacturing process significantly reduces the volume of metallic parts in the structure, substantially reducing the weight. This also leads to the elimination of a significant volume of metallic cold bridges between the interior and exterior of chilled or refrigerated compartments, which reduces thermal losses and the energy required to achieve the specified compartment temperature.

Various features and embodiments of the present invention have been described herein, but the foregoing description is not intended to be limiting or exclusive. Rather, it would be apparent to one of ordinary skill in the art that various modifications would be readily available, and the present invention is intended to cover all such modifications and alternative embodiments.

I claim:

1. A monument for an aircraft, comprising an above work deck subassembly, a below work deck subassembly, and a rear service wall subassembly, wherein the above work deck subassembly and below work deck subassembly are each manufactured and cured as a complete integrated structural subassembly of carbon fiber reinforced composites (CFRC) pre-impregnated panel skins, and wherein localized reinforcement at mating surfaces is established by application of unidirectional carbon fiber plies at a juncture of the mating surfaces over the CFRC pre-impregnated panel skins.

2. The monument for an aircraft of claim 1, wherein the monument is a refrigerated centerline galley.

3. The monument for an aircraft of claim 2, wherein the above work deck subassembly is formed with an array of compartments sized to house galley inserts (GAINs) in the galley.

4. The monument for an aircraft of claim 3, wherein the array of compartments are formed using a wet lay process where layers of materials are placed in a mold over a wet lay, and then the compartments are reinforced with unidirectional carbon fiber reinforcing plies.

5. The monument for an aircraft of claim 4, wherein a finished molded surface of an above work deck subassembly molding provides an upper section of an air ducting for a chiller in the above work deck subassembly.

6. The monument for an aircraft of claim 1, further comprising a pair of channels on an upper surface of the above work deck that each receive a ceiling mount for mounting the monument to an upper portion of an airframe of the aircraft.

7. The monument for an aircraft of claim 6, wherein the ceiling mount is formed of a composite and have orthogonal plates, including a first orthogonal plate sliding within one of the channels on the upper surface of the above work deck subassembly.

8. The monument for an aircraft of claim 1, wherein the below work deck subassembly includes floor fixtures embedded in the below work deck subassembly during a manufacturing process.

9. The monument for an aircraft of claim 1, wherein fixing points are integrated into the monument using a wet lay process.

10. The monument for an aircraft of claim 1, wherein the above work deck subassembly and the below work deck subassembly are sealed with a plastic extrusion.

11. The monument for an aircraft of claim 1, wherein the rear service wall subassembly includes vents and recesses that cooperate to vent air through the monument.

12. The monument for an aircraft of claim 1, wherein the monument has no supplemental metallic reinforcements.

\* \* \* \* \*